March 6, 1928.  F. CARLEY  1,661,920

SAFETY DEVICE FOR RAILWAY VEHICLES

Filed Feb. 10, 1927

F. Carley, INVENTOR

Patented Mar. 6, 1928.

1,661,920

UNITED STATES PATENT OFFICE.

FRANCIS CARLEY, OF REID RIVER, QUEENSLAND, AUSTRALIA.

SAFETY DEVICE FOR RAILWAY VEHICLES.

Application filed February 10, 1927, Serial No. 167,303, and in Australia February 23, 1926.

This invention consists of an attachment to railway vehicles which automatically causes air to be released from the pipe line of the brake system in the event of a wheel of a vehicle leaving the rail.

Briefly stated the invention consists in utilizing the lowering of the vehicle from the rail height in the event of derailment, to actuate a contact member depending from the vehicle and so associate with the brake air pipe line as to cause release of the air in said pipe and consequent application of the brakes.

In one practical form the contact member is made in tubular form of brittle metal with one end closed and the other open end inserted into a length of flexible hose connected with the air brake pipe line.

The contact member may be arranged in close proximity to a wheel and to overlie one of the rails. There is, however, no limitation to the shape and disposition of the contact member provided that during normal running it is clear of the rail and the permanent way and in the event of derailment of the vehicle it effects ground or rail contact to an extent sufficient to cause same to function.

Figure 1:
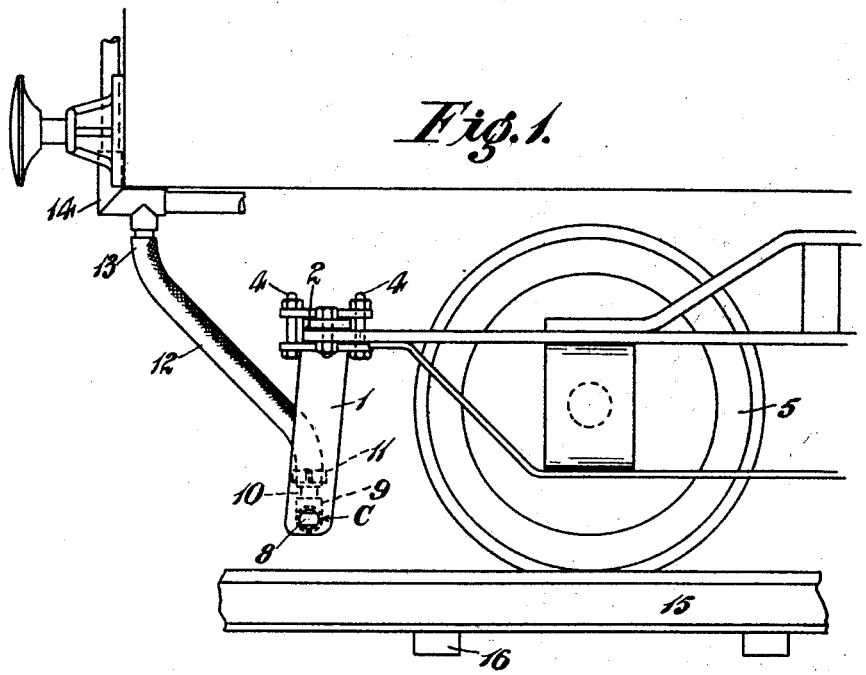
Figure 2:
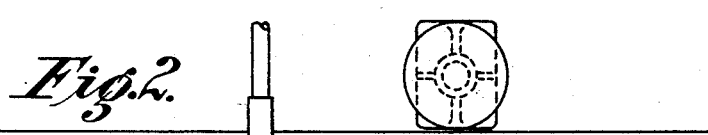

One practical form of the invention is illustrated in the accompanying drawings whereof, Figure 1, is a side elevation of a portion of a railway vehicle and, Figure 2, an end elevation showing the invention applied.

Figure 3:
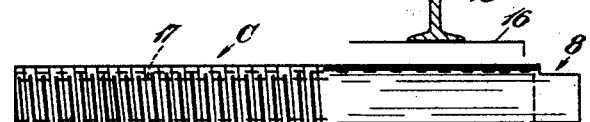

Figure 3, is an enlarged view of the contact member.

Figure 4:
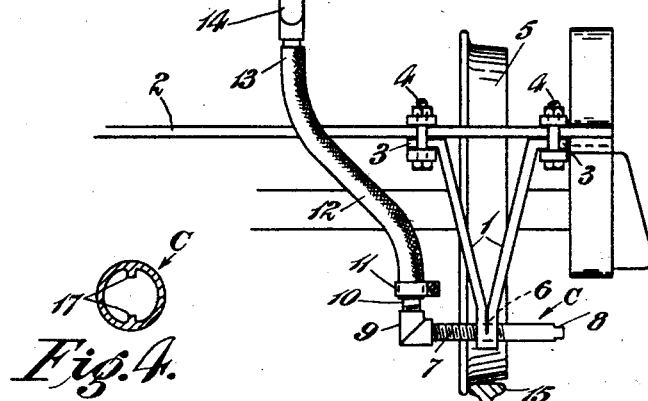

Figure 4 a transverse section thereof.

According to the form of the invention illustrated the hollow contact member C preferably of cylindrical shape is suitably secured to a wrought iron or the like depending bracket or shoe 1 fixed or clamped to the bogie or other suitable rigid part 2 of the vehicle. Such bracket may be U or V shaped with flanges 3 at the upper end to facilitate attachment by bolts or clamps and said bracket is preferably arranged close to a wheel 5 and in longitudinal alignment therewith.

The lower end of the bracket is close to the rail 15 and may be formed with a screw threaded hole 6 to receive the hollow contact member portion of which is provided with external threads 7. To facilitate screwing into position the outer end 8 of the contact member is squared or flattened for spanner grip.

The contact member as illustrated is horizontal and centrally fixed to the bracket and is conveniently in the form of a cast iron cylinder plugged at the end 8 while the other end is screwed into an elbow 9 having a short pipe 10 fitted into and secured by a clamp 11 to a flexible length of hose 12 connected at the other end 13 with the train pipe 14 controlling the brakes of the vehicle.

In the case of derailment the contact member shown will immediately strike the rail 15 a sleeper 16 or the ground surface and break close to the bracket so that air at once escapes from the train pipe 14 and the brakes are applied.

In order to facilitate removal of the part of the hollow cylindrical contact member still screwed to the bracket said member is provided internally with means for engagement of a plug spanner or other tool for turning said member. For instance the cylinder may be formed internally with a pair of longitudinal fins or lugs 17 or with corresponding grooves.

I claim:

1. A safety device for railway vehicles for application to the air brake pipe line including in combination, a vertically disposed bracket adapted to be suspended from the frame of the vehicle and terminating short of the lower edges of the wheels thereof and provided at the lower end with a threaded aperture, a cylindrical and exteriorly threaded contact member of brittle metal adjustably and removably engaged with the threaded aperture in the bracket and position horizontally thereof and having one end closed and the other end opened, and means for establishing communication between the open end of the member and the air brake pipe line of the vehicle.

2. A safety device for railway vehicles for application to the air brake pipe line comprising, a bracket adapted to be secured to a part of the frame of the vehicle and depending vertically therefrom and arranged close to a wheel and to the rail, the lower end of the bracket being provided with a threaded hole, a cylinder of brittle metal screw threaded exteriorly for engagement with the threaded hole in the bracket and disposed horizontally of the bracket one end of the cylinder being closed and the other end opened, an elbow engaged with the open end of the cylinder, and a flexible hose connected to the elbow and arranged in connection with the air brake pipe line.

3. A safety device for railway vehicles comprising a bracket depending from the vehicle, a contact member projecting downwardly from the vehicle and terminating above the rail or permanent way level, said member being hollow and plugged at one end and screwed into the bracket, said member being formed at its plugged end and internally with means for rotating same by a spanner.

Dated this seventeenth day of December, 1927.

FRANCIS CARLEY.